(12) United States Patent
Lee et al.

(10) Patent No.: US 9,369,191 B2
(45) Date of Patent: Jun. 14, 2016

(54) THROUGHPUT BASED RANK SELECTION

(71) Applicant: QUALCOMM Incorporated, San Diego, CA (US)

(72) Inventors: Heechoon Lee, San Diego, CA (US); Feng Han, San Diego, CA (US); Sanaz Barghi, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/567,911

(22) Filed: Dec. 11, 2014

(65) Prior Publication Data

US 2015/0326288 A1 Nov. 12, 2015

Related U.S. Application Data

(60) Provisional application No. 61/990,008, filed on May 7, 2014.

(51) Int. Cl.
- *H04B 7/02* (2006.01)
- *H04L 1/02* (2006.01)
- *H04B 7/04* (2006.01)
- *H04B 7/06* (2006.01)

(52) U.S. Cl.
CPC ............ *H04B 7/0456* (2013.01); *H04B 7/0413* (2013.01); *H04B 7/063* (2013.01); *H04B 7/0617* (2013.01); *H04B 7/0619* (2013.01)

(58) Field of Classification Search
CPC ............................ H04B 7/0456; H04B 7/0413
USPC .......................................................... 375/267
See application file for complete search history.

(56) References Cited

U.S. PATENT DOCUMENTS

| | | | |
|---|---|---|---|
| 2008/0013610 A1* | 1/2008 | Varadarajan et al. | 375/221 |
| 2008/0049596 A1 | 2/2008 | Khojastepour et al. | |
| 2010/0002598 A1* | 1/2010 | Pan et al. | 370/252 |
| 2010/0215110 A1* | 8/2010 | Onggosanusi et al. | 375/260 |
| 2012/0057538 A1 | 3/2012 | Adhikari et al. | |
| 2012/0076028 A1* | 3/2012 | Ko et al. | 370/252 |

(Continued)

FOREIGN PATENT DOCUMENTS

| | | |
|---|---|---|
| EP | 2 665 203 A1 | 11/2013 |
| WO | WO-2009/096601 A1 | 8/2009 |

OTHER PUBLICATIONS

International Search Report and Written Opinion—PCT/US2015/025351—ISA/EPO—Jun. 22, 2015. (10 total pages).

*Primary Examiner* — Tanmay Shah
(74) *Attorney, Agent, or Firm* — Arent Fox LLP (57) ABSTRACT

Aspects described herein relate to selecting a rank for wireless communications using multiple transmit antenna layers. A first effective throughput achievable using a first rank and based at least in part on a first block error rate (BLER) associated with the first rank can be estimated along with a second effective throughput achievable using a second rank and based at least in part on a second BLER associated with the second rank. The first rank or second rank is selected to be used for transmitting communications over multiple transmit antenna layers based at least in part on comparing the first effective throughput to the second effective throughput, and the selection can be indicated to a transmitting entity from which the communications over the multiple transmit antenna layers are received.

30 Claims, 7 Drawing Sheets

(56) References Cited

U.S. PATENT DOCUMENTS

| | | | |
|---|---|---|---|
| 2013/0042157 A1* | 2/2013 | Mohammadi | H04L 1/1812 714/704 |
| 2013/0322376 A1* | 12/2013 | Marinier et al. | 370/329 |
| 2014/0307645 A1* | 10/2014 | Ji et al. | 370/329 |
| 2015/0071208 A1* | 3/2015 | Seo et al. | 370/329 |

* cited by examiner

THROUGHPUT BASED RANK SELECTION

CLAIM OF PRIORITY UNDER 35 U.S.C. §119

The present application for patent claims priority to Provisional Application No. 61/990,008 entitled "THROUGHPUT BASED RANK SELECTION FOR MIMO" filed May 7, 2014, which is assigned to the assignee hereof and hereby expressly incorporated by reference herein.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). Generally, a wireless multiple-access communication system can simultaneously support communication for multiple wireless terminals (e.g., user equipment (UE)), each of which can communicate with one or more base stations over downlink or uplink resources.

In addition, communication systems can include a multiple-input multiple-output (MIMO) system employing multiple ($N_T$) transmit antennas and multiple ($N_R$) receive antennas for data transmission. A MIMO channel formed by the $N_T$ transmit and $N_R$ receive antenna layers may be decomposed into $N_S$ independent channels, which are also referred to as spatial channels, where $N_S \leq \min\{N_T, N_R\}$. The MIMO system can provide improved performance (e.g., higher throughput, greater reliability, etc.) if the additional dimensionalities created by the multiple transmit and receive antennas are utilized and radio conditions over each of the multiple antennas are desirable. Similarly, in some examples, communication systems can include a multiple-input single-output (MISO) system employing multiple ($N_T$) transmit antenna layers to provide transmit diversity, and a single receive antenna layer.

In such systems that utilize multiple ($N_T$) transmit antenna layers, a receiving entity (e.g., a UE) can select and indicate a rank to a transmitting entity (e.g., a network entity), where the rank specifies a number of antenna layers (which may relate to a number of physical or virtual antennas) to utilize in transmitting to the receiving entity. The receiving entity computes a sum of transport block sizes (TBS) estimated for each antenna layer corresponding to a given rank and compares the sums to determine a rank with the largest sum TBS. In estimating the TBS, the receiving entity estimates channel quality for each antenna layer with a given beamforming vector and converts the channel quality to a corresponding TBS. Estimating TBS in this regard, however, may not always lead to optimal rank selection.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for selecting a rank for wireless communications using multiple transmit antenna layers is described. The method includes estimating a first effective throughput achievable using a first rank and based at least in part on a first block error rate (BLER) associated with the first rank, estimating a second effective throughput achievable using a second rank and based at least in part on a second BLER associated with the second rank, and selecting the first rank or the second rank to be used for transmitting communications over multiple transmit antenna layers based at least in part on comparing the first effective throughput to the second effective throughput. The method also includes transmitting an indication of selection of the first rank or the second rank to a transmitting entity from which the communications over the multiple transmit antenna layers are received.

In another aspect, an apparatus for selecting a rank for wireless communications using multiple transmit antenna layers is described. The apparatus includes a throughput estimating component configured to estimate a first effective throughput achievable using a first rank and based at least in part on a first block error rate (BLER) associated with the first rank, and to estimate a second effective throughput achievable using a second rank and based at least in part on a second BLER associated with the second rank. The apparatus further includes a rank selecting component configured to select the first rank or the second rank to be used for transmitting communications over multiple transmit antenna layers based at least in part on comparing the first effective throughput to the second effective throughput, and a communicating component configured to transmit an indication of selection of the first rank or the second rank to a transmitting entity from which the communications over the multiple transmit antenna layers are received.

In yet another aspect, an apparatus for selecting a rank for wireless communications using multiple transmit antenna layers is described. The apparatus includes means for estimating a first effective throughput achievable using a first rank and based at least in part on a first block error rate (BLER) associated with the first rank, and estimating a second effective throughput achievable using a second rank and based at least in part on a second BLER associated with the second rank. The apparatus further includes means for selecting the first rank or the second rank to be used for transmitting communications over multiple transmit antenna layers based at least in part on comparing the first effective throughput to the second effective throughput, and means for transmitting an indication of selection of the first rank or the second rank to a transmitting entity from which the communications over the multiple transmit antenna layers are received.

In still a further aspect, a computer-readable medium storing computer executable code for selecting a rank for wireless communications using multiple transmit antenna layers is described. The computer-readable medium includes code for estimating a first effective throughput achievable using a first rank and based at least in part on a first block error rate (BLER) associated with the first rank, code for estimating a second effective throughput achievable using a second rank and based at least in part on a second BLER associated with the second rank, and code for selecting the first rank or the second rank to be used for transmitting communications over multiple transmit antenna layers based at least in part on comparing the first effective throughput to the second effective throughput. The computer-readable medium further includes code for transmitting an indication of selection of the first rank or the second rank to a transmitting entity from which the communications over the multiple transmit antenna layers are received.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. Moreover, in an aspect, a component may be generally understood to be one of the parts that make up a system, may be hardware or software, and/or may be divided into other components.

Described herein are various aspects related to selecting a rank for communications that utilize multiple transmit antenna layers based at least in part on considering a block error rate (BLER) in estimating throughput over each of a plurality of ranks. For example, a rank can relate to a number of antenna layers to utilize in transmitting wireless communications. In determining a rank to utilize in transmitting wireless communications, an effective throughput achievable over the rank can be estimated (e.g., as a sum of effective throughputs over each transmit antenna layer in the rank). In one example, each rank or transmit antenna layer in the rank may have a corresponding target or measured BLER that may be used in estimating the effective throughput. A target BLER can generally relate to a ratio of a number of transport blocks received to an acceptable a number of the received transport blocks for which decoding fails (e.g., cyclic redundancy check failed). A measured BLER can relate to the actual ratio measured over a period of time.

In addition, for example, when decoding of a received transport block fails, the transport block can be retransmitted (e.g., according to a hybrid automatic repeat/request (HARQ) or other retransmission mechanism). Thus, in an example, the retransmission, and/or additional subsequent retransmissions, may have different associated target or measured BLERs, and the various BLERs may be considered in estimating the effective throughput for each rank or transmit antenna layer. In any case, the rank with the largest effective throughout may be used for communicating over the multiple transmit antenna layers. For example, the rank may be determined by and indicated from a receiving entity (e.g., a user equipment (UE)) to a transmitting entity (e.g., a network entity) to request that the rank be used in transmitting communications to the receiving entity. This can provide a more accurate throughput estimation for rank selection in communications using multiple transmit antenna layers.

Moreover, though generally described herein in terms of the UE selecting rank for downlink communications from a network entity, it is to be appreciated that the receiving entity can be a network entity and the transmitting entity can be a UE, and thus concepts and functions described herein can additionally or alternatively be used for the network entity selecting and/or indicating a rank for uplink communications from the UE. Furthermore, it is to be appreciated that the receiving and transmitting entities can respectively be substantially any network nodes that can communicate using multiple transmit antennas.

As used herein, "transmit antenna layer" can refer to one or more physical antennas or related antenna ports, one or more virtual antenna ports relating to one or more physical antennas, one or more streams or transmission layers that are encoded for transmitting over the one or more physical antennas, related antenna portions, or virtual antenna ports, according to a corresponding rank, and/or the like.

Figure 1:
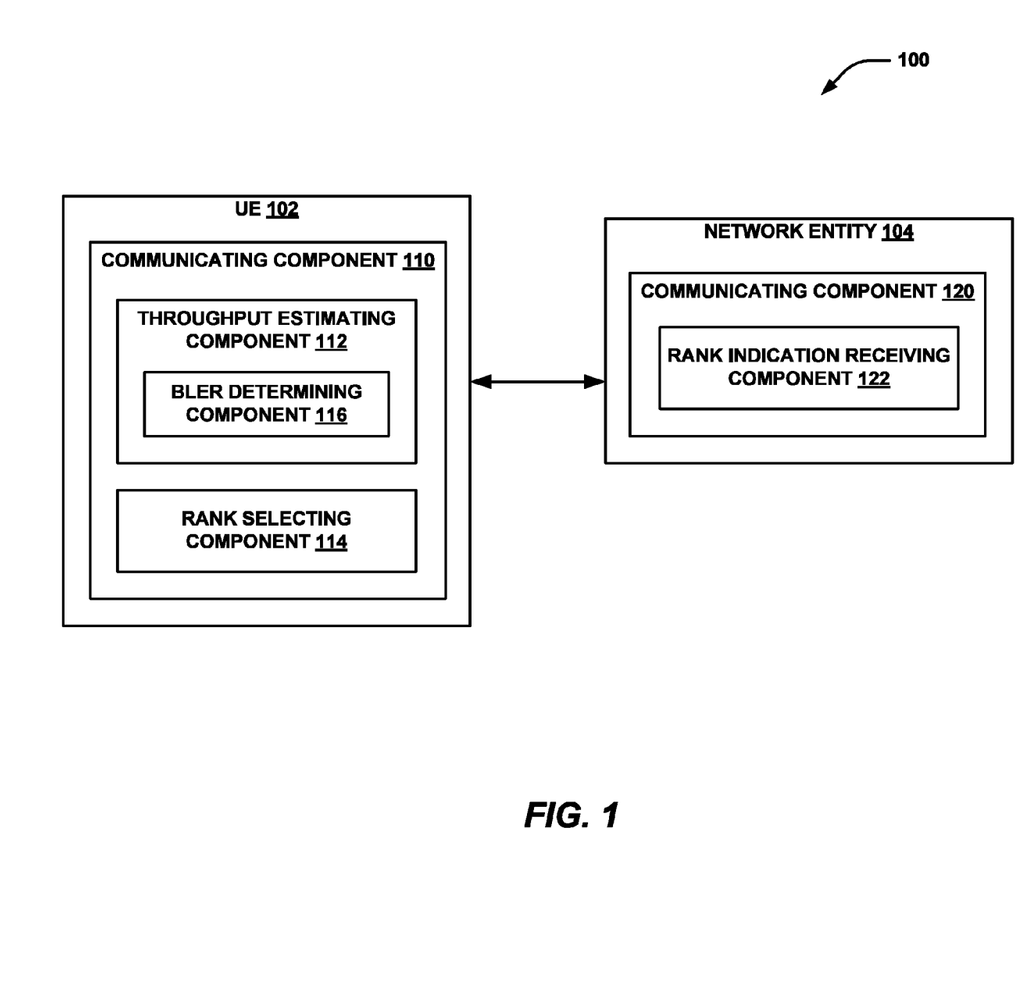
FIG. 1 is a block diagram illustrating an example wireless communications system according to aspects described herein.
Figure 2:
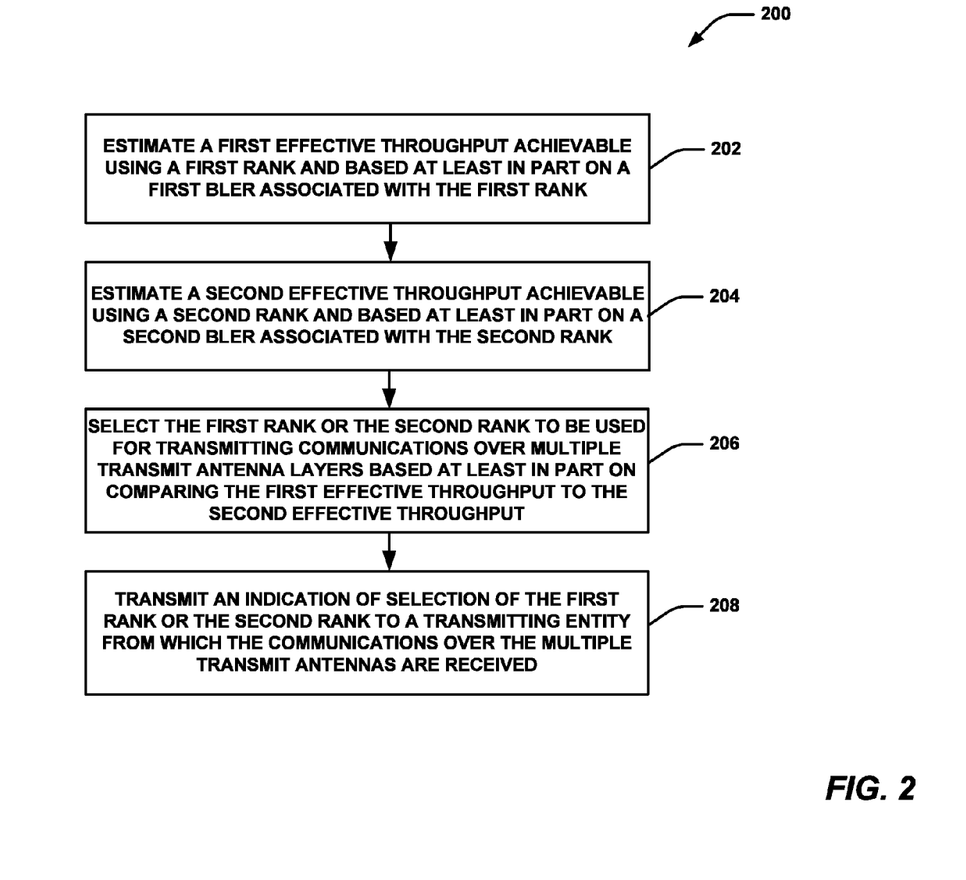
FIG. 2 is a flow diagram comprising a plurality of functional blocks representing an example methodology aspects described herein.

Referring to FIGS. 1 and 2, aspects are depicted with reference to one or more components and one or more methods that may perform the actions or functions described herein. Although the operations described below in FIG. 2 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 1 is a schematic diagram illustrating a system 100 for wireless communication, according to an example configuration. FIG. 1 includes a UE 102 that communicates with a network entity 104 to access a wireless network. In this regard, the network entity 104 can configure UE 102 for communicating based on a wireless network technology. For example, network entity 104 can configure UE 102 to receive communications from, and/or transmit communications to, network entity 104 by communicating one or more resource grants to the UE 102 that indicate time and/or frequency resources for communicating with the network entity 104. Though one UE 102 and one network entity 104 are shown, it is to be appreciated that multiple UEs 102 can communicate with a network entity 104, a UE 102 can communicate with multiple network entities 104, and/or the like. In addition, though UE 102 is generally described as the receiving entity for receiving multiple rank transmission and the network entity 104 is described as the transmitting entity of the multiple rank transmissions, it is to be appreciated that the network entity 104 can be the receiving entity and UE 102 can be the transmitting entity of the multiple rank transmissions. In this regard, network entity 104 can include the components for performing the functions of UE 102 described below, in one example, and/or vice versa.

In addition, the UE 102 and/or network entity 104 can communicate using multiple antenna layers on the uplink and/or downlink, which may correspond to multiple physical antennas or virtual antennas configured over one or more antenna ports. In an example, network entity 104 can include multiple transmit antenna layers (not shown) for transmitting to UE 102 to provide transmit diversity. In one example, network entity 104 can transmit to UE 102 over the multiple antenna layers in multiple-input single-output (MISO), multiple-input multiple-output (MIMO) or similar communications. In additional examples, downlink communications from network entity 104 can include communications that utilize one or more antenna layers of network entity 104 in conjunction with one or more transmit antenna layers of other network entities (not shown) in carrier aggregation, such that the multiple network entities can provide coordinated transmission of communications over the multiple transmit antenna layers to UE 102 at each network entity.

UE 102 can include a communicating component 110 for managing communications and associated resources with network entity 104. Communicating component 110 can include a throughput estimating component 112 for estimating an effective throughput achievable for downlink transmissions from one or more network entities over a plurality of ranks or related transmit antenna layers, and a rank selecting component 114 for selecting one of the plurality of ranks based at least in part on comparing the estimated effective throughputs of the plurality of ranks or related transmit antenna layers. Throughput estimating component 112 can include a BLER determining component 116 for determining a target BLER specified for each rank or related transmit antenna layers or computing a measured BLER for each rank or related transmit antenna layers. Network entity 104 can include a communicating component 120 for managing communications and associated resources with UE 102. Communicating component 120 may include a rank indication receiving component 122 for receiving a rank indication from the UE 102 requested for use in transmissions from network entity 104.

UE 102 may comprise any type of mobile device, such as, but not limited to, a smartphone, cellular telephone, mobile phone, laptop computer, tablet computer, or other portable networked device that can be a standalone device, tethered to another device (e.g., a modem connected to a computer), a watch, a personal digital assistant, a personal monitoring device, a machine monitoring device, a machine to machine communication device, etc. In addition, UE 102 may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable and may be configured to communicate wirelessly via an over-the-air communication link using one or more OTA communication protocols described herein. Additionally, in some examples, UE 102 may be configured to facilitate communication on multiple separate networks via multiple separate subscriptions, multiple radio links, and/or the like.

Furthermore, network entity 104 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a mobility management entity (MME), a radio network controller (RNC), a small cell, etc. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Additionally, network entity 104 may communicate with one or more other network entities of wireless and/or core networks Additionally, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs 102 according to this standard. As those skilled in the art will readily appreciate, various aspects described herein may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in frequency division duplexing (FDD), time division duplexing (TDD), or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi- Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, network entity 104) may be coupled to a core network via one or more wired or wireless connections.

FIG. 2 illustrates a method 200 for selecting a rank for wireless communications using multiple transmit antenna layers. Method 200 includes, at Block 202, estimating a first effective throughput achievable using a first rank and based at least in part on a first BLER associated with the first rank. Throughput estimating component 112 (FIG. 1) can estimate the first effective throughput achievable using the first rank and based at least in part on the first BLER associated with the first rank. BLER can generally refer to a ratio of transport blocks received in error to a total number of transport blocks received, which can be expressed as a percentage (e.g., 10% BLER can refer to 10% of the total number transport blocks over a period of time that are received in error). For example, BLER determining component 116 can determine the first BLER associated with the first rank as a BLER for the rank or a BLER for each transmit antenna layer of the rank. In addition, for example, BLER determining component 116 can determine the target BLER as a BLER for the rank or for each transmit antenna. In an example, the BLER can be received in a configuration from network entity 104 (e.g., for triggering reporting events when the BLER is not achieved). In another example, BLER determining component 116 can determine the target BLER as a measured BLER computed based at least in part on measured statistics at UE 102, such as a ratio of a number of transport blocks received by communicating component 110 from network entity 104 to a number of the transport blocks for which decoding fails at communicating component 110 over a period of time.

In any case, throughput estimating component 112 can estimate an effective throughput for the rank or one or more transmit antenna layers associated with the rank based at least in part on the BLER determined for the rank and/or the one or more transmit antenna layers. For example, throughput estimating component 112 can estimate the effective throughput based additionally on an estimated channel quality associated with communications received over the rank and/or related transmit antenna layers. In one specific example, throughput estimating component 112 can estimate an effective throughput as an estimated transport block size (TBS) for a rank based on the BLER and channel quality using a formula similar to the following:

$$\text{Effective}_{Tput} = \sum_{i=1}^{N_s} TBS_i \times (1 - BLER_i) + \frac{TBS_i}{2} \times BLER_i$$
$$= \sum_{i=1}^{N_s} TBS_i \times \left(1 - \frac{BLER_i}{2}\right)$$

where $N_s$ is the number of transmit antenna layers for the rank, $TBS_i$ is the TBS corresponding to an estimated channel quality achievable over transmit antenna layer i that targets a target BLER determined by BLER determining component 116, and $BLER_i$ is the target BLER after a first HARQ transmission (e.g., of a HARQ retransmission after an initial transmission of data) over the transmit antenna layer i, as determined by BLER determining component 116. As described above, it is to be appreciated that one or more of the target BLERs (e.g., $BLER_i$) can include a BLER measured by the BLER determining component 116 over the associated transmit antenna layer in past communications, a combination of the target and measured BLERs (e.g., an average, weighted average, etc.), and/or the like.

In another specific example, the above formula can be extended to apply BLERs of additional HARQ transmissions (e.g., where the first HARQ retransmission fails). For example, where BLER determining component 116 determines additional target or measured BLERs are available for subsequent HARQ transmissions, throughput estimating component 112 may estimate the effective throughput according to a formula similar to the following:

$$\text{Effective}_{Tput} =$$
$$\sum_{i=1}^{N_s} TBS_i \times (1 - BLER_{1,i}) + \frac{TBS_i}{2} \times BLER_{1,i} \times (1 - BLER_{2,i}) + \ldots +$$
$$\frac{TBS_i}{N-1} \times BLER_{1,i} \times \ldots \times BLER_{N-2,i} \times (1 - BLER_{N-1,i}) +$$
$$\frac{TBS_i}{N} \times BLER_{1,i} \times \ldots \times BLER_{N,i}$$

where $BLER_{k,i}$ is the conditional BLER after the kth HARQ transmission for transmit antenna layer i, as determined by BLER determining component 116.

Method 200 similarly includes, at Block 204, estimating a second effective throughput achievable using a second rank and based at least in part on a second BLER associated with the second rank. Throughput estimating component 112 can also estimate the second effective throughput achievable using the second rank based at least in part on the second BLER associated with the second rank. For example, throughput estimating component 112 can estimate the second effective throughput for the second rank using a one of the various mechanisms described above with reference to Block 202, and may use a mechanism that is similar or different as that used in Block 202 above. It is to be appreciated that throughput estimating component 112 may estimate the first and second effective throughputs for the first and second ranks along with other effective throughputs for additional ranks, and may compare the effective throughputs for these ranks to determine which rank has the largest effective throughput (e.g., TBS).

In addition, for example, throughput estimating component 112 can estimate the first and second (or additional) throughputs before or after selecting a beamforming vector for each rank. For example, throughput estimating component 112 may determine one of a plurality of beamforming vectors specified for each rank that results in the highest estimated channel quality for the rank, and may then estimate effective throughputs for the ranks considering the BLER(s) and based on the determined beamforming vector. In another example, throughput estimating component 112 may estimate effective throughputs for the ranks considering the BLER(s) for each of the plurality of beamforming vectors, and may determine the beamforming vector with the highest estimated effective throughput for use in estimating the effective throughput for the rank.

Method 200 also includes, at Block 206, selecting the first rank or the second rank to be used for transmitting communications over multiple transmit antenna layers based at least in part on comparing the first effective throughput to the second effective throughput. Rank selecting component 114 can select the first rank or the second rank to be used for transmitting communications over multiple transmit antenna layers based at least in part on comparing the first effective throughput to the second effective throughput. For example, rank selecting component 114 can select the first rank where the first effective throughput is higher than the second effective throughput, and/or vice versa.

Method 200 further includes, at Block 208, transmitting an indication of selection of the first rank or the second rank to a transmitting entity from which the communications over the multiple transmit antennas are received. Communicating component 110 can transmit the indication of selection of the first rank or the second rank to the transmitting entity from which the communications over the multiple transmit antennas are received. As described, the transmitting entity can be network entity 104, though it is to be appreciated that the receiving entity can be network entity 104 and the transmitting entity can be UE 102, in some examples. In addition, communicating component 110 can include or can utilize one or more transmitters/transceivers (e.g., transceiver 310 in FIG. 3, transmitter(s) 752 in FIG. 7, etc.), transmit processors (e.g., TX data processor 738, etc.), and/or the like to transmit the indication of the selection to the transmitting entity. For example, communicating component 110 can utilize a rank indicator (RI) in uplink control information defined for the wireless technology in communicating the selected rank to the network entity 104. Rank indication receiving component 122 can obtain the (RI) from UE 102, and can utilize the RI in selecting a rank for transmitting communications to UE 102 via communicating component 120, and/or for scheduling communications for transmission to UE 102 via communicating component 120. In addition, in an example, network entity 104 may support carrier aggregation with other network entities (e.g., neighboring cells and/or related Node Bs), and the rank for which the effective throughput is determined by UE 102 and to which the RI relates may correspond to transmit antenna layers at network entity 104 and/or at other network entities, as described.

Figure 3:
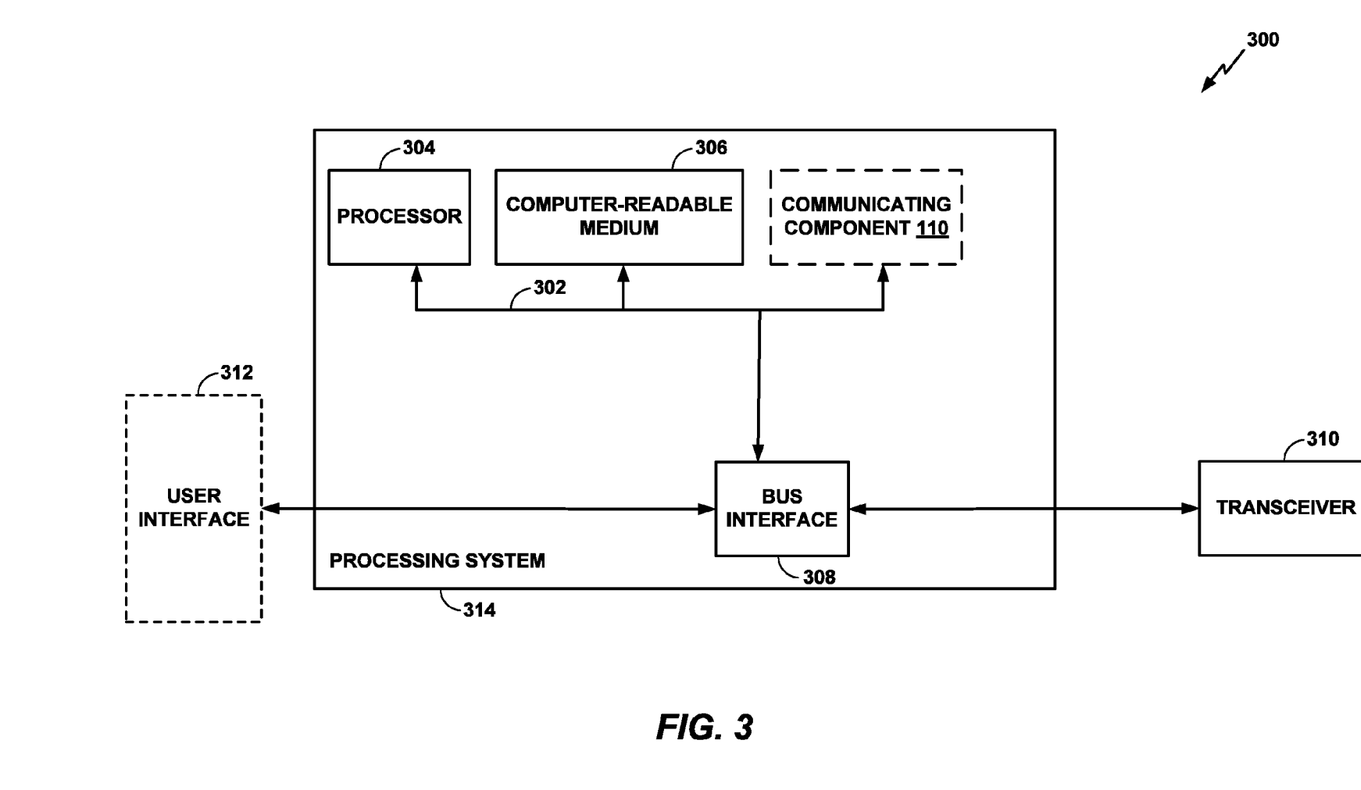
FIG. 3 is a diagram illustrating an example of a hardware implementation for an apparatus employing a processing system.

FIG. 3 is a conceptual diagram illustrating an example of a hardware implementation for an apparatus 300 employing a processing system 314. In some examples, the processing system 314 may comprise a UE, network entity, etc., or a component of a UE, network entity, etc. (e.g., UE 102 or network entity 104 of FIG. 1, etc.). In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors, represented generally by the processor 304, computer-readable media, represented generally by the computer-readable medium 306, communicating component 110 (FIG. 1), components thereof, etc., which may be configured to carry out one or more methods or procedures described herein.

The bus 302 may also link various other circuits such as timing sources, peripherals, voltage regulators, and power management circuits, which are well known in the art. A bus interface 308 provides an interface between the bus 302 and a transceiver 310. The transceiver 310 provides a means for communicating with various other apparatus over a transmission medium. In an example, transceiver 310 can include or perform the functions of communicating component 110 as described herein. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described infra for any particular apparatus. The computer-readable medium 306 may also be used for storing data that is manipulated by the processor 304 when executing software.

In an aspect, processor 304, computer-readable medium 306, or a combination of both may be configured or otherwise specially programmed to perform the functionality of the communicating component 110, components thereof, or various other components described herein. For example, processor 304, computer-readable medium 306, or a combination of both may be configured or otherwise specially programmed to perform the functionality of communicating component 110, components thereof, etc., described herein, and/or the like. Accordingly, in an example, processor 304 can perform the functions of throughput estimating component 112, rank selecting component 114, BLER determining component 116, etc., which can include performing Blocks 202, 204, 206, and/or 208 of FIG. 2. In addition, processor 304 and/or communicating component 110 can utilize transceiver 310 transmitting the indication of the selection of a first or second rank to the transmitting entity (e.g., a network entity, as described herein).

Figure 4:
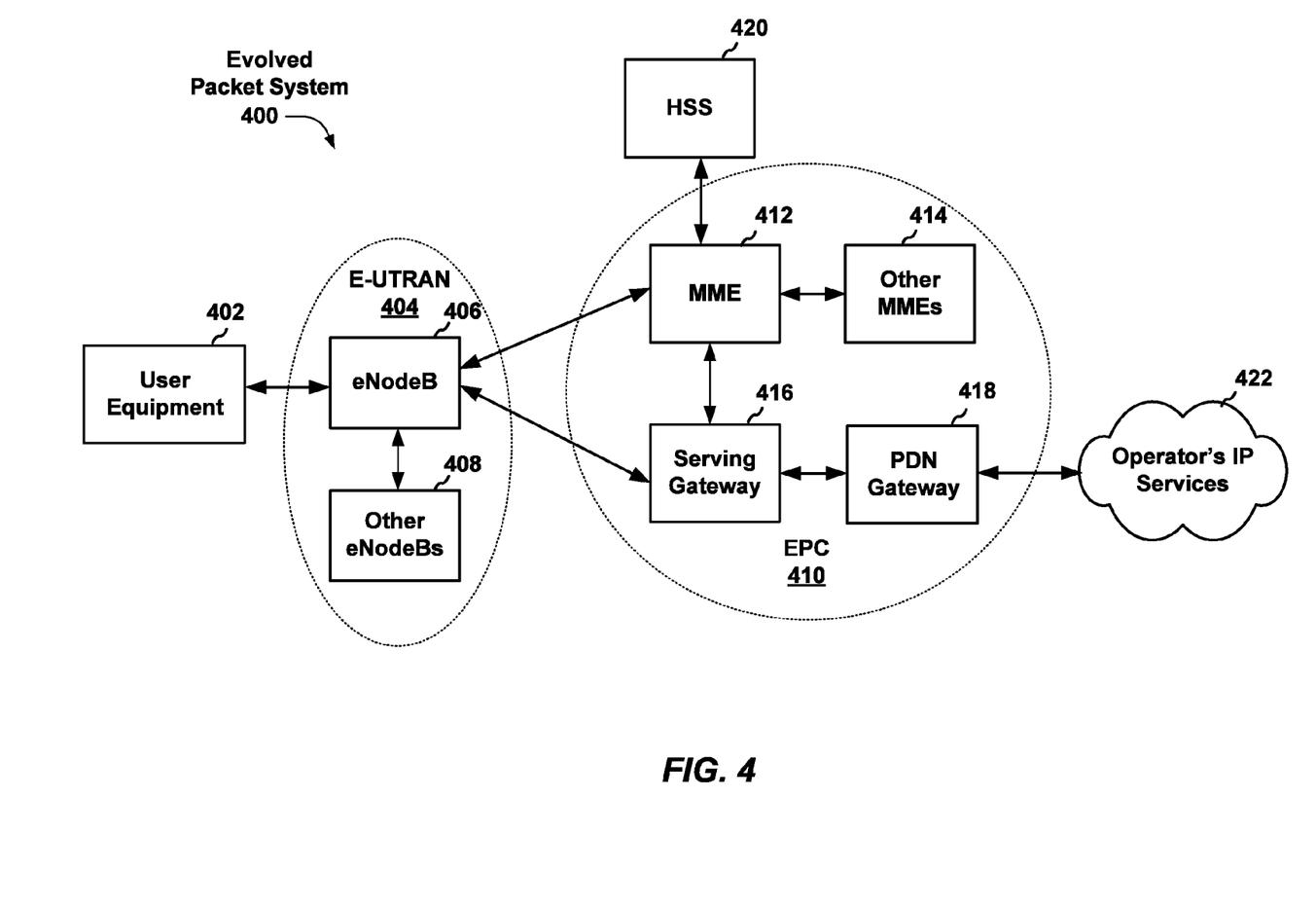
FIG. 4 is a block diagram conceptually illustrating an example of an LTE telecommunications system.

FIG. 4 is a diagram illustrating an LTE network architecture 400 employing various apparatuses (e.g., UE 102 and network entity 104 of FIG. 1). The LTE network architecture 400 may be referred to as an Evolved Packet System (EPS) 400. The EPS 400 may include one or more user equipment (UE) 402 (which may represent UE 102 of FIG. 1), an Evolved UMTS Terrestrial Radio Access Network (E-UTRAN) 404, an Evolved Packet Core (EPC) 410, a Home Subscriber Server (HSS) 420, and an Operator's IP Services 422. The EPS can interconnect with other access networks, but for simplicity those entities/interfaces are not shown. As shown, the EPS provides packet-switched services, however, as those skilled in the art will readily appreciate, the various concepts presented herein may be extended to networks providing circuit-switched services.

The E-UTRAN includes the evolved Node B (eNB) 406 and other eNBs 408, one or more of which may represent network entity 104 of FIG. 1. The eNB 406 provides user and control plane protocol terminations toward the UE 402. The eNB 406 may be connected to the other eNBs 408 via an X2 interface (i.e., backhaul). The eNB 406 may also be referred to by those skilled in the art as a base station, a base transceiver station, a radio base station, a radio transceiver, a transceiver function, a basic service set (BSS), an extended service set (ESS), or some other suitable terminology. The eNB 406 provides an access point to the EPC 410 for a UE 402. Examples of UEs 402 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 402 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 406 is connected by an S1 interface to the EPC 410. The EPC 410 includes a Mobility Management Entity (MME) 412, other MMEs 414, a Serving Gateway 416, and a Packet Data Network (PDN) Gateway 418. The MME 412 is the control node that processes the signaling between the UE 402 and the EPC 410. Generally, the MME 412 provides bearer and connection management. All user IP packets are transferred through the Serving Gateway 416, which itself is connected to the PDN Gateway 418. The PDN Gateway 418 provides UE IP address allocation as well as other functions. The PDN Gateway 418 is connected to the Operator's IP Services 422. The Operator's IP Services 422 include the Internet, the Intranet, an IP Multimedia Subsystem (IMS), and a PS Streaming Service (PSS).

Figure 5:
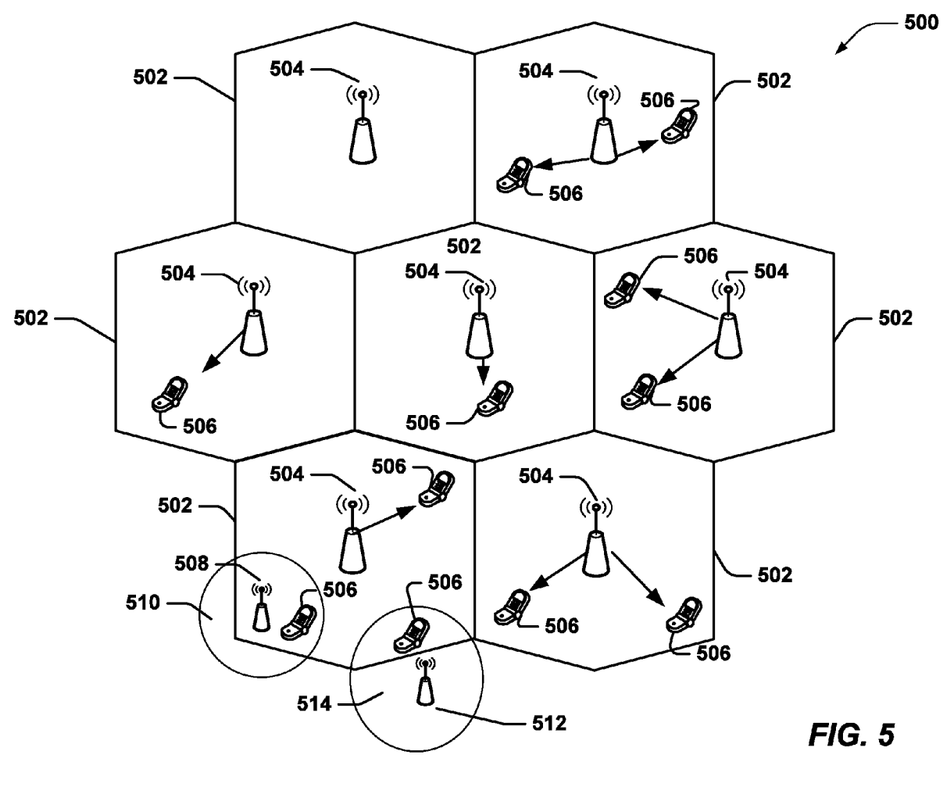
FIG. 5 is a diagram illustrating an example of an access network in an LTE network architecture.

FIG. 5 is a diagram illustrating an example of an access network in an LTE network architecture. In this example, the access network 500 is divided into a number of cellular regions (cells) 502. One or more lower power class eNBs 508, 512 may have cellular regions 510, 514, respectively, that overlap with one or more of the cells 502. The lower power class eNBs 508, 512 may be small cells (e.g., home eNBs (HeNBs)). A higher power class or macro eNB 504 is assigned to a cell 502 and is configured to provide an access point to the EPC 410 for all the UEs 506 in the cell 502. There is no centralized controller in this example of an access network 500, but a centralized controller may be used in alternative configurations. The eNB 504 is responsible for all radio related functions including radio bearer control, admission control, mobility control, scheduling, security, and connectivity to the serving gateway 416. In an aspect, one or more of the eNBs 504, 508, 512 may represent network entity 104 of FIG. 1.

The modulation and multiple access scheme employed by the access network 500 may vary depending on the particular telecommunications standard being deployed. In LTE applications, orthogonal frequency-division multiplexing (OFDM) is used on the downlink (DL) and single-carrier frequency division multiple access (SC-FDMA) is used on the uplink (UL) to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 504 may have multiple antennas supporting multiple-input, multiple output (MIMO) technology. The use of MIMO technology enables the eNB 504 to exploit the spatial domain to support spatial multiplexing, beamforming, and transmit diversity.

Spatial multiplexing may be used to transmit different streams of data simultaneously on the same frequency. The data steams may be transmitted to a single UE 506 to increase the data rate or to multiple UEs 506 to increase the overall system capacity. This is achieved by spatially precoding each data stream and then transmitting each spatially precoded stream through a different transmit antenna on the downlink. The spatially precoded data streams arrive at the UE(s) 506 with different spatial signatures, which enables each of the UE(s) 506 to recover the one or more data streams destined for that UE 506. On the uplink, each UE 506 transmits a spatially precoded data stream, which enables the eNB 504 to identify the source of each spatially precoded data stream. In an aspect, UE 506 may include UE 102 of FIG. 1.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 6:
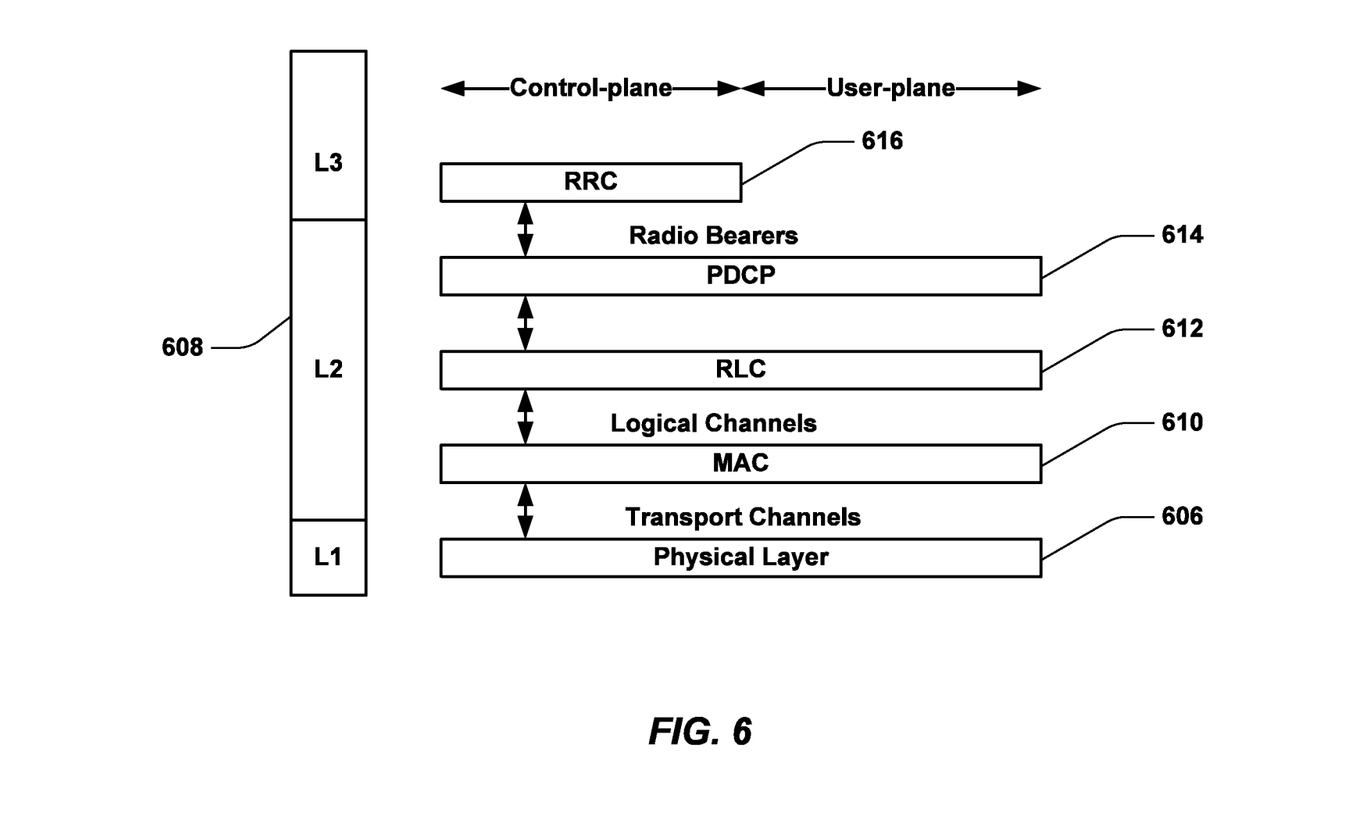
FIG. 6 is a diagram illustrating an example of a radio protocol architecture for the user and control plane.

Turning to FIG. 6, the radio protocol architecture for a UE (e.g., UE 102 of FIG. 1) and an eNB (e.g., network entity 104 of FIG. 1) is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 418 (see FIG. 4) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
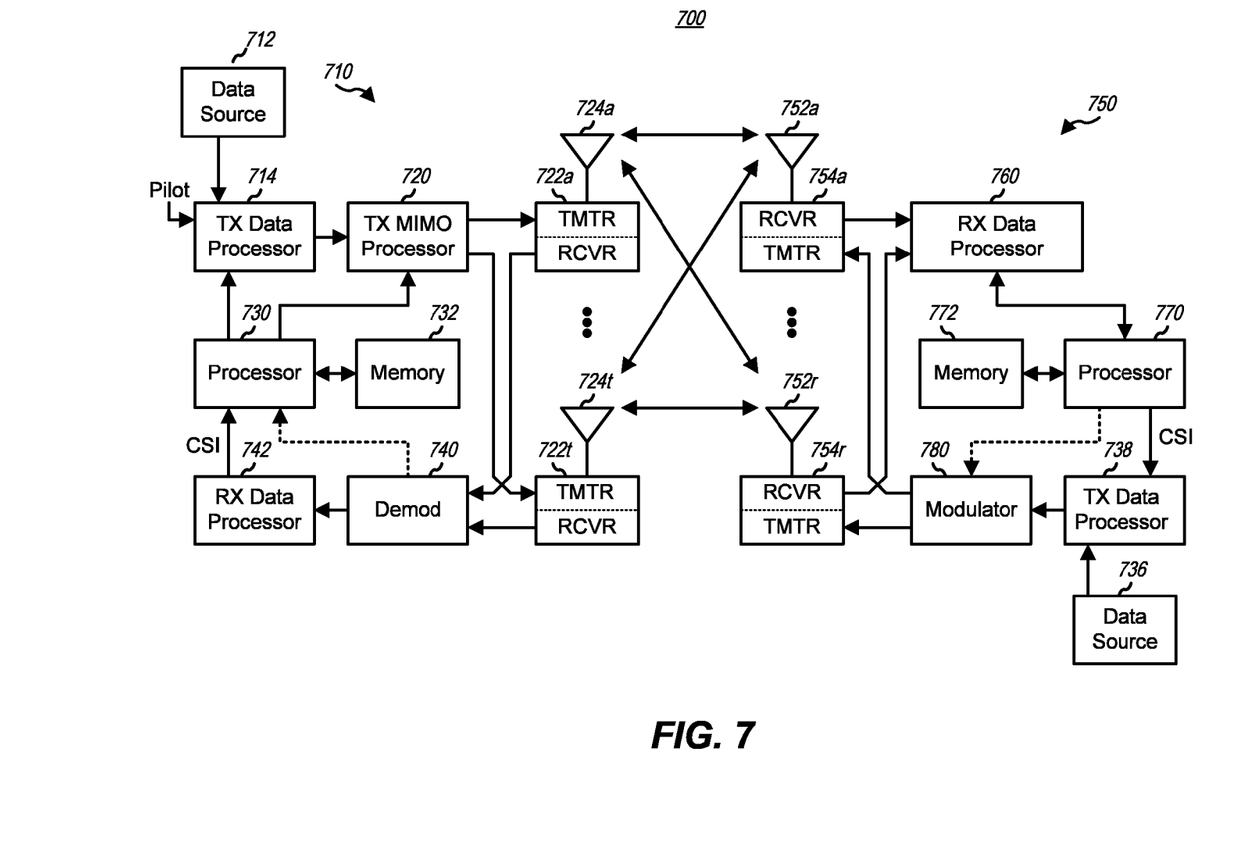
FIG. 7 is a diagram illustrating an example of an evolved Node B and user equipment in an access network.

FIG. 7 is a block diagram of an embodiment of a transmitter system 710 (e.g., a transmitting entity, such as a network entity) and a receiver system 750 (e.g., a receiving entity, such as a UE) in a MIMO system 700. For example, transmitter system 710 may include network entity 104, and/or one or more components thereof, such as communicating component 120, rank indication receiving component 122, etc. for receiving and utilizing a rank in communicating with receiver system 750 over multiple transmitter antennas 724. Similarly, receiver system 750 may include UE 102, and/or one or more components thereof, such as a communicating component 110, throughput estimating component 112, rank selecting component 114, BLER determining component 116, etc. for selecting a rank for use by the transmitter system 710 (e.g., by performing Blocks 202, 204, 206, 208 of FIG. 2). At the transmitter system 710, traffic data for a number of data streams is provided from a data source 712 to a transmit (TX) data processor 714.

In an embodiment, each data stream is transmitted over a respective transmit antenna. TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 730.

The modulation symbols for all data streams are then provided to a TX MIMO processor 720, which may further process the modulation symbols (e.g., for OFDM). TX MIMO processor 720 then provides $N_T$ modulation symbol streams to $N_T$ transmitters (TMTR) 722a through 722t. In certain embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 722a through 722t are then transmitted from $N_T$ antennas 724a through 724t, respectively.

At receiver system 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ receivers 754 based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710.

A processor 770 periodically determines which pre-coding matrix to use (discussed below). Processor 770 formulates a reverse link message comprising a matrix index portion and a rank value portion.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by transmitters 754a through 754r, and transmitted back to transmitter system 710.

At transmitter system 710, the modulated signals from receiver system 750 are received by antennas 724, conditioned by receivers 722, demodulated by a demodulator 740, and processed by a RX data processor 742 to extract the reserve link message transmitted by the receiver system 750. Processor 730 then determines which pre-coding matrix to use for determining the beamforming weights then processes the extracted message.

Several aspects of a telecommunications system have been presented with reference to a W-CDMA system. As those skilled in the art will readily appreciate, various aspects described herein may be extended to other telecommunication systems, network architectures and communication standards.

By way of example, various aspects described herein may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects described herein, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein. One or more processors in the processing system may execute software. Software shall be construed broadly to mean instructions, instruction sets, code, code segments, program code, programs, subprograms, software modules, applications, software applications, software packages, routines,

What is claimed is:

1. A method for selecting a rank for wireless communications using multiple transmit antenna layers, comprising:
estimating a first effective throughput achievable using a first rank and based at least in part on a first block error rate (BLER), wherein the first BLER is associated with a first retransmission of a first initial transmission over the first rank;
estimating a second effective throughput achievable using a second rank and based at least in part on a second BLER, wherein the second BLER is associated with a second first retransmission of a second initial transmission over the second rank;
selecting the first rank or the second rank to be used for transmitting communications over multiple transmit antenna layers based at least in part on comparing the first effective throughput to the second effective throughput; and
transmitting an indication of selection of the first rank or the second rank to a transmitting entity from which the communications over the multiple transmit antenna layers are received.

2. The method of claim 1, further comprising receiving at least one of the first BLER or the second BLER in a configuration from a network entity.

3. The method of claim 1, further comprising computing at least one of the first BLER based at least in part on past transmissions using the first rank or the second BLER based at least in part on past transmissions using the second rank.

4. The method of claim 1, wherein at least the first BLER corresponds to a first target BLER associated with the first retransmission, and wherein at least estimating the first effective throughput is further based at least in part on a second target BLER, wherein the second target BLER is associated with a second retransmission of the first initial transmission over the first rank.

5. The method of claim 1, further comprising selecting a beamforming vector for each of the first rank and the second rank, wherein estimating the first effective throughput is based at least in part on the beamforming vector for the first rank, and wherein estimating the second effective throughput is based at least in part on the beamforming vector for the second rank.

6. The method of claim 1, further comprising estimating effective throughputs for a plurality of beamforming vectors using the first rank and based at least in part on the first BLER, and further comprising selecting one of the plurality of beamforming vectors for estimating the first effective throughput using the first rank based at least in part on the effective throughputs for the plurality of beamforming vectors.

7. The method of claim 1, wherein at least the first effective throughput corresponds to a sum of transport block sizes over antenna layers corresponding to the first rank.

8. The method of claim 1, wherein selecting the first rank or the second rank includes determining which of the first effective throughput and the second effective throughput is greater.

9. An apparatus for selecting a rank for wireless communications using multiple transmit antenna layers, comprising:
a throughput estimating component configured to estimate a first effective throughput achievable using a first rank and based at least in part on a first block error rate (BLER), and estimate a second effective throughput achievable using a second rank and based at least in part on a second BLER, wherein the first BLER is associated with a first retransmission of a first initial transmission over the first rank, and wherein the second BLER is associated with a second first retransmission of a second initial transmission over the second rank;

a rank selecting component configured to select the first rank or the second rank to be used for transmitting communications over multiple transmit antenna layers based at least in part on comparing the first effective throughput to the second effective throughput; and a communicating component configured to transmit an indication of selection of the first rank or the second rank to a transmitting entity from which the communications over the multiple transmit antenna layers are received.

10. The apparatus of claim 9, wherein the communicating component is further configured to receive at least one of the first BLER or the second BLER in a configuration from a network entity.

11. The apparatus of claim 9, further comprising a BLER determining component configured to compute at least one of the first BLER based at least in part on past transmissions using the first rank or the second BLER based at least in part on past transmissions using the second rank.

12. The apparatus of claim 9, wherein at least the first BLER corresponds to a first target BLER associated with the first retransmission, and wherein the throughput estimating component is configured to estimate at least the first effective throughput further based at least in part on a second target BLER, wherein the second target BLER is associated with a second retransmission of the first initial transmission over the first rank.

13. The apparatus of claim 9, wherein the throughput estimating component is further configured to select a beamforming vector for each of the first rank and the second rank, wherein the throughput estimating component is configured to estimate the first effective throughput based at least in part on the beamforming vector for the first rank, and estimate the second effective throughput based at least in part on the beamforming vector for the second rank.

14. The apparatus of claim 9, wherein the throughput estimating component is further configured to estimate effective throughputs for a plurality of beamforming vectors using the first rank and based at least in part on the first BLER, and select one of the plurality of beamforming vectors for estimating the first effective throughput using the first rank based at least in part on the effective throughputs for the plurality of beamforming vectors.

15. The apparatus of claim 9, wherein at least the first effective throughput corresponds to a sum of transport block sizes over antenna layers corresponding to the first rank.

16. The apparatus of claim 9, wherein the rank selecting component is configured to select the first rank or the second rank based at least in part on determining which of the first effective throughput and the second effective throughput is greater.

17. An apparatus for selecting a rank for wireless communications using multiple transmit antenna layers, comprising:
means for estimating a first effective throughput achievable using a first rank and based at least in part on a first block error rate (BLER), and estimating a second effective throughput achievable using a second rank and based at least in part on a second BLER, wherein the first BLER is associated with a first retransmission of a first initial transmission over the first rank, and wherein the second BLER is associated with a second first retransmission of a second initial transmission over the second rank;

means for selecting the first rank or the second rank to be used for transmitting communications over multiple transmit antenna layers based at least in part on comparing the first effective throughput to the second effective throughput; and means for transmitting an indication of selection of the first rank or the second rank to a transmitting entity from which the communications over the multiple transmit antenna layers are received.

18. The apparatus of claim 17, further comprising means for receiving at least one of the first BLER or the second BLER in a configuration from a network entity.

19. The apparatus of claim 17, further comprising means for computing at least one of the first BLER based at least in part on past transmissions using the first rank or the second BLER based at least in part on past transmissions using the second rank.

20. The apparatus of claim 17, wherein at least the first BLER corresponds to a first target BLER associated with the first retransmission, and wherein the means for estimating estimates at least the first effective throughput further based at least in part on a second target BLER, wherein the second target BLER is associated with a second retransmission of the first initial transmission over the first rank.

21. The apparatus of claim 17, wherein the means for estimating selects a beamforming vector for each of the first rank and the second rank, estimates the first effective throughput based at least in part on the beamforming vector for the first rank, and estimates the second effective throughput based at least in part on the beamforming vector for the second rank.

22. The apparatus of claim 17, wherein the means for estimating estimates effective throughputs for a plurality of beamforming vectors using the first rank and based at least in part on the first BLER, and selects one of the plurality of beamforming vectors for estimating the first effective throughput using the first rank based at least in part on the effective throughputs for the plurality of beamforming vectors.

23. The apparatus of claim 17, wherein at least the first effective throughput corresponds to a sum of transport block sizes over antenna layers corresponding to the first rank.

24. A non-transitory computer-readable medium storing computer executable code for selecting a rank for wireless communications using multiple transmit antenna layers, comprising:
code for estimating a first effective throughput achievable using a first rank and based at least in part on a first block error rate (BLER), wherein the first BLER is associated with a first retransmission of a first initial transmission over the first rank;

code for estimating a second effective throughput achievable using a second rank and based at least in part on a second BLER, wherein the second BLER is associated with a second first retransmission of a second initial transmission over the second rank;

code for selecting the first rank or the second rank to be used for transmitting communications over multiple transmit antenna layers based at least in part on comparing the first effective throughput to the second effective throughput; and code for transmitting an indication of selection of the first rank or the second rank to a transmitting entity from which the communications over the multiple transmit antenna layers are received.

25. The computer-readable medium of claim 24, further comprising code for receiving at least one of the first BLER or the second BLER in a configuration from a network entity.

26. The computer-readable medium of claim 24, further comprising code for computing at least one of the first BLER based at least in part on past transmissions using the first rank or the second BLER based at least in part on past transmissions using the second rank.

27. The computer-readable medium of claim 24, wherein at least the first BLER corresponds to a first target BLER associated with the first retransmission, and further comprising code for estimating at least the first effective throughput further based at least in part on a second target BLER, wherein the second target BLER is associated with a second retransmission of the first initial transmission over the first rank.

28. The computer-readable medium of claim 24, further comprising code for selecting a beamforming vector for each of the first rank and the second rank, code for estimating the first effective throughput based at least in part on the beamforming vector for the first rank, and code for estimating the second effective throughput based at least in part on the beamforming vector for the second rank.

29. The computer-readable medium of claim 24, further comprising code for estimating effective throughputs for a plurality of beamforming vectors using the first rank and based at least in part on the first BLER, and code for selecting one of the plurality of beamforming vectors for estimating the first effective throughput using the first rank based at least in part on the effective throughputs for the plurality of beamforming vectors.

30. The computer-readable medium of claim 24, wherein at least the first effective throughput corresponds to a sum of transport block sizes over antenna layers corresponding to the first rank.

\* \* \* \* \*